United States Patent
Chen et al.

(10) Patent No.: US 12,363,338 B2
(45) Date of Patent: Jul. 15, 2025

(54) METHODS AND APPARATUS OF VIDEO CODING FOR DERIVING AFFINE MOTION VECTORS FOR CHROMA COMPONENTS

(71) Applicant: BEIJING DAJIA INTERNET INFORMATION TECHNOLOGY CO., LTD., Beijing (CN)

(72) Inventors: Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/352,127

(22) Filed: Jun. 18, 2021

(65) Prior Publication Data
US 2021/0314601 A1    Oct. 7, 2021

Related U.S. Application Data

(63) Continuation of application No. PCT/US2019/066098, filed on Dec. 21, 2019.
(Continued)

(51) Int. Cl.
*H04N 19/513*    (2014.01)
*H04N 19/96*    (2014.01)

(52) U.S. Cl.
CPC .......... *H04N 19/521* (2014.11); *H04N 19/96* (2014.11)

(58) Field of Classification Search
CPC ...... H04N 19/521; H04N 19/96; H04N 19/70; H04N 19/186; H04N 19/513; H04N 19/52;
(Continued)

(56) References Cited

U.S. PATENT DOCUMENTS

2012/0288006 A1    11/2012 Sato
2013/0022120 A1    1/2013  Gupte et al.
(Continued)

FOREIGN PATENT DOCUMENTS

CN    1347620 A    5/2002
CN    101005620 A    7/2007
(Continued)

OTHER PUBLICATIONS

Bross, Benjamin, et al., "Versatile Video Coding (Draft 2)", Joint Video Experts Team (JVET) of ITU-T SG 16 WP 3 and ISO/IEC JTC 1/SC 29/WG 11, Document JVET-K1001-v7, 11th Meeting: Ljubljana, SI, Jul. 10-18, 2018, (p. 9, 14, 48, 69, 71, 82 , 88, 92, 98-99, 101). (Year: 2018).*
(Continued)

*Primary Examiner* — Matthew K Kwan
(74) *Attorney, Agent, or Firm* — Arch & Lake LLP; Shen Wang; Hao Tan

(57) ABSTRACT

A method for video coding is provided. The method may include: arranging video data in a plurality of luma subblocks and a plurality of chroma subblocks, where each chroma subblock corresponds to one or more luma subblocks; and deriving an affine motion vector for a chroma subblock out of the chroma subblocks using motion vectors of the corresponding luma subblocks. The video data has a
(Continued)

---

1302
arranging video data in a plurality of luma subblocks and a plurality of chroma subblocks, wherein each chroma subblock corresponds to one or more luma subblocks

1304
deriving an affine motion vector for a chroma subblock out of the chroma subblocks using motion vectors of the corresponding luma subblocks; wherein the video data has a color sub-sampling format, and the corresponding luma subblocks are derived according to the color sub-sampling format color sub-sampling format, and the corresponding luma subblocks are derived according to the color sub-sampling format.

6 Claims, 9 Drawing Sheets

Related U.S. Application Data

(60) Provisional application No. 62/784,369, filed on Dec. 21, 2018.

(58) Field of Classification Search
CPC .. H04N 19/523; H04N 19/527; H04N 19/132; H04N 19/423; H04N 19/54
USPC ................................................... 375/240.16
See application file for complete search history.

(56) References Cited

U.S. PATENT DOCUMENTS

| | | | |
|---|---|---|---|
| 2013/0051469 A1 | 2/2013 | Park et al. | |
| 2015/0124865 A1 | 5/2015 | Kim et al. | |
| 2016/0227245 A1* | 8/2016 | Liu | H04N 19/137 |
| 2016/0337661 A1 | 11/2016 | Pang et al. | |
| 2017/0105014 A1 | 4/2017 | Lee et al. | |
| 2017/0272748 A1 | 9/2017 | Seregin et al. | |
| 2017/0332095 A1 | 11/2017 | Zou et al. | |
| 2018/0205946 A1 | 7/2018 | Zhang et al. | |
| 2020/0099945 A1* | 3/2020 | Pham Van | H04N 19/513 |
| 2020/0120353 A1* | 4/2020 | Xu | H04N 19/513 |
| 2020/0260108 A1* | 8/2020 | Chen | H04N 19/176 |

FOREIGN PATENT DOCUMENTS

| | | |
|---|---|---|
| CN | 102714735 A | 10/2012 |
| CN | 104247425 A | 12/2014 |
| CN | 105723707 A | 6/2016 |
| CN | 107211147 A | 9/2017 |
| CN | 108353184 A | 7/2018 |
| CN | 108432250 A | 8/2018 |
| CN | 108781282 A | 11/2018 |
| EP | 2230849 A1 | 9/2010 |
| KR | 1020150070848 A | 6/2015 |
| WO | 2016160608 A1 | 10/2016 |
| WO | 2017086748 A1 | 5/2017 |
| WO | 2017171107 A1 | 10/2017 |
| WO | 2017204532 A1 | 11/2017 |
| WO | 2018062921 A1 | 4/2018 |
| WO | 2018070152 A1 | 4/2018 |
| WO | 2018110180 A1 | 6/2018 |
| WO | 2018221631 A1 | 12/2018 |
| WO | 2020072788 A1 | 4/2020 |

OTHER PUBLICATIONS

Bross et al. ("Versatile Video Coding (Draft 3)", JVET-L1001-v7, Oct. 3-12, 2018). (Year: 2018).*

International Search Report of PCT Application No. PCT/US2019/066098 dated Apr. 13, 2020, (3p).

Bross, Benjamin, et al., "Versatile Video Coding (Draft 2)", Joint Video Experts Team (JVET) of ITU-T SG 16 WP 3 and ISO/IEC JTC 1/SC 29/WG 11, Document JVET-K1001-v7, 11th Meeting: Ljubljana, SI, Jul. 10-18, 2018, (141p).

Benjamin Bross et al., "Versatile Video Coding (Draft 3)"-2, JVET-L1001-v7, 12 Meeting, Macao, China, Oct. 3-12, 2018 (first cited in the Office Action of the counterpart Japanese Application No. 2021-535786 from JPO on Dec. 21, 2021), (12p).

Benjamin Bross et al., "Versatile Video Coding (Draft 3)" JVET-L1001-v7, 12 Meeting, Macao, China, Oct. 3-12, 2018, (first cited in the European search report of the counterpart European Application No. 19899829.6 from EPO on Dec. 15, 2021), (227p).

Filippov (Huawei) et al., "Support of 4:4:4 and 4:"2:2 chroma formats in VVC" JVET-N0671-v3, 14th Meeting, Geneva, CH, Mar. 19-27, 2019 (first cited in the European search report of the counterpart European Application No. 19899829.6 from EPO on Dec. 15, 2021), (8p).

Zhang (Bytedance) K et al: "CE4: Affine Prediction with 4x4 Sub-blocks for Chroma Components (Test 4.1.16)", 12. JVET Meeting; Oct. 3, 2018-Oct. 12, 2018; Macao; (The Joint Video Exploration Team of ISO/IECJTCI/SC29/WG11 and ITU-T SG. 16 ), No. JVET-L0265 Oct. 4, 2018 (Oct. 4, 2018), XP030194667, Retrieved from the Internet: URL:http://phenix.int-evry.fr/jvet/doc_end_user/documents/12_Macao/wg11/JVET-L0265-v2.zip JVET-L0265.docx [retrieved on Oct. 4, 2018].

Zhang (Bytedance) K et al: "CE4: Affine Prediction with 4x4 Sub-blocks for Chroma Components (Test 4.1.16)", 12. JVET Meeting; Oct. 3, 2018-Oct. 12, 2018; Macao; (The Joint Video Exploration Team of ISO/IECJTCI/SC29/WG11 and ITU-T SG. 16 ), No. JVET-L0265 Oct. 4, 2018 (Oct. 4, 2018), XP030194666, Retrieved from the Internet: URL:http://phenix.int-evry.fr/jvet/doc_end_user/documents/12_Macao/wg11/JVET-L0265-v2.zip JVET-L0265-WD.docx [retrieved on Oct. 4, 2018].

Summons to attend oral proceedings for European patent application 19899829.6 from the European Patent Office dated Jan. 4, 2023, (11p).

First CNOA issued on Application No. 2023109883860 dated Feb. 8, 2024 with English translation, (10p).

Notice of Hearing of Indian application No. 202117027332 dated on Jan. 10, 2024 with English translation, (3p).

* cited by examiner

METHODS AND APPARATUS OF VIDEO CODING FOR DERIVING AFFINE MOTION VECTORS FOR CHROMA COMPONENTS

CROSS-REFERENCE TO RELATED APPLICATIONS

The present application is a continuation of PCT Application PCT/US2019/066098 filed Dec. 21, 2019, which is based on and claims priority to US Provision Application No. 62/784,369, entitled "Affine Motion Vectors for Chroma Components" filed on Dec. 21, 2018, which is incorporated by reference in its entirety for all purpose.

FIELD

The present application generally relates to video data encoding and decoding, and in particular but not limited to, methods and apparatus of video coding for deriving affine motion vectors for chroma components.

BACKGROUND

The following abbreviations and acronyms are herewith defined, at least some of which are referred to within the following description:
International Telecommunication Union (ITU), ITU Telecommunication Standardization Sector (ITU-T), Moving Picture Experts Group (MPEG), Advanced Video Coding (AVC), High Efficiency Video Coding (HEVC), Versatile Video Coding (VVC), Joint Exploration Test Model (JEM), VVC Test Model (VTM), Joint Video Experts Team (JVET), Video Coding Experts Group (VCEG), Motion Vector (MV), Motion Vector Prediction (MVP), Motion Vector Difference (MVD), Motion Vector Field (MVF), Advanced Motion Vector Prediction (AMVP), Motion Vector Competition (MVC), Temporal Motion Vector Prediction (TMVP), Control Point Motion Vector (CPMV), Control Point Motion Vector Prediction (CPMVP), Motion Compensation Prediction (MCP), Bi-predictive (B), Block Copy (BC), Context-based Adaptive Binary Arithmetic Coding (CABAC), Context Adaptive Variable Length Coding (CAVLC), encoder/decoder (CODEC), Coded Picture Buffer (CPB), Coding Tree Unit (CTU), Coding Unit (CU), Discrete Cosine Transform (DCT), Decoded Picture Buffer (DPB), Intra (I), Intra Block Copy (IBC), Predictive (P), Probability Interval Partitioning Entropy (PIPE), Picture Unit (PU), Sum Of Absolute Difference (SAD), Syntax-Based Context-Adaptive Binary Arithmetic Coding (SBAC), Sum Of Square Difference (SSD).

In this disclosure, the term "luma," represented by the symbol or subscript Y or L, is used for specifying that a sample array or single sample is representing the monochrome signal related to the primary colors. The term luma is used rather than the term luminance in order to avoid the implication of the use of linear light transfer characteristics that is often associated with the term luminance. The symbol L is sometimes used instead of the symbol Y to avoid confusion with the symbol y as used for vertical location. The term "chroma," represented by the symbols Cb and Cr, is used for specifying that a sample array or single sample is representing one of the two color difference signals related to the primary colors. The term chroma is used rather than the term chrominance in order to avoid the implication of the use of linear light transfer characteristics that is often associated with the term chrominance.

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Digital video devices implement video coding techniques, such as those described in the standards defined by Versatile Video Coding (VVC), Joint Exploration Test Model (JEM), MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUS). Each CU can be coded in intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of video data to be encoded/decoded grows exponentially. It is a constant challenge in terms of how the video data can be encoded/decoded more efficiently while maintaining the image quality of the decoded video data.

In a Joint Video Experts Team (JVET) meeting, JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meetings.

SUMMARY

In general, this disclosure describes examples of techniques relating to video coding for deriving affine motion vectors for chroma components.

According to a first aspect of the present disclosure, there is provided a method for video coding, comprising: arranging video data in a plurality of luma subblocks and a plurality of chroma subblocks, wherein each chroma subblock corresponds to one or more luma subblocks; and deriving an affine motion vector for a chroma subblock out of the chroma subblocks using motion vectors of the corresponding luma subblocks; wherein the video data has a color sub-sampling format, and the corresponding luma subblocks are derived according to the color sub-sampling format.

According to a second aspect of the present disclosure, there is provided an apparatus for video coding, comprising: a processor; and a memory configured to store instructions executable by the processor; wherein the processor, upon execution of the instructions, is configured to: arrange video data in a plurality of luma subblocks and a plurality of chroma subblocks, wherein each chroma subblock corresponds to one or more luma subblocks; and derive an affine motion vector for a chroma subblock out of the chroma subblocks using motion vectors of the corresponding luma subblocks; wherein the video data has a color sub-sampling format, and the corresponding luma subblocks are derived according to the color sub-sampling format.

According to a third aspect of the present disclosure, there is provided a non-transitory computer readable storage medium, comprising instructions stored therein, wherein, when the instructions are executed by a processor, the instructions cause the processor to: arrange video data in a plurality of luma subblocks and a plurality of chroma subblocks, wherein each chroma subblock corresponds to one or more luma subblocks; and derive an affine motion vector for a chroma subblock out of the chroma subblocks using motion vectors of the corresponding luma subblocks; wherein the video data has a color sub-sampling format, and the corresponding luma subblocks are derived according to the color sub-sampling format.

BRIEF DESCRIPTION OF DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
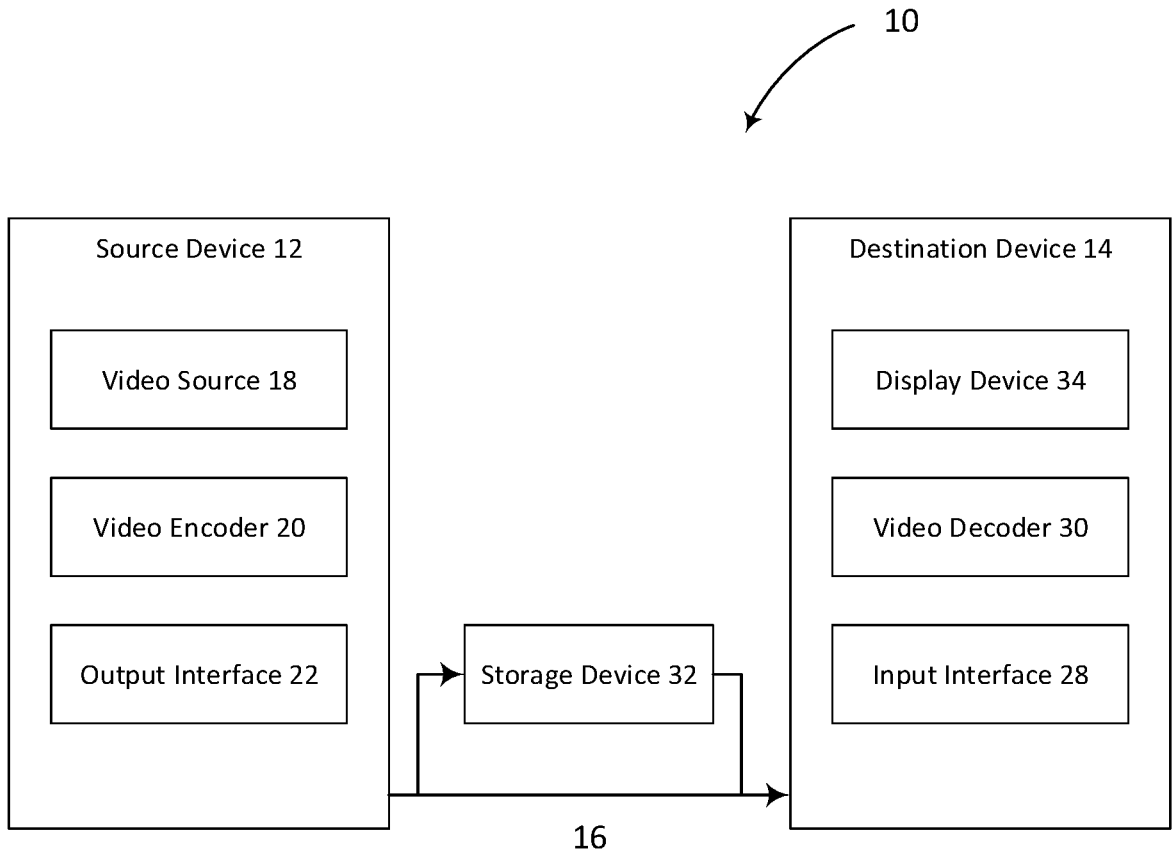
FIG. 1 is a block diagram illustrating an exemplary video encoding and decoding system in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The description of elements in each figure may refer to elements of other figures. Like-numbers may refer to like-elements in the figures, including alternative embodiments of like-elements.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The terminology used in the present disclosure is for the purpose of describing particular examples only and is not intended to limit the present disclosure. The terms "including," "comprising," "having," and variations thereof mean "including but not limited to," unless expressly specified otherwise.

It shall be further understood that these terms specify the presence of stated features, integers, steps, operations, elements and/or components, but do not preclude the presence or addition of one or more other features, integers, steps, operations, elements, components and/or combinations thereof.

An enumerated listing of items does not imply that any or all of the items are mutually exclusive, unless expressly specified otherwise.

As used in this disclosure and the appended claims, the singular forms "a," "an," and "the" are intended to include the plural forms as well, and should be interpreted as equivalent to "one or more" or "at least one," unless the context clearly indicates otherwise.

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B.

The character "/" generally indicates an "or" relationship of the associated items, but may also include an "and" relationship of the associated items. For example, "A/B" may also include the co-existence of both A and B, unless the context indicates otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

A first element and a second element may exist independently. For example, some embodiments may include a second element only, without any first element. Accordingly, a second element may be described, prior to description of a first element, or without description of the first element. For example, a "first step" of a method or process may be carried or performed after, or simultaneously with, a "second step."

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. It may require the method to be implemented with both the capability of performing function or action X', and the capability of performing function or action Y', while the functions X' and Y' may both be performed, at different times, on multiple executions of the method. It may further be implemented with the capability of detecting or evaluating satisfaction of condition X, and the capability of detecting or evaluating satisfaction of condition Y.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g., intra or inter).

Figure 10:
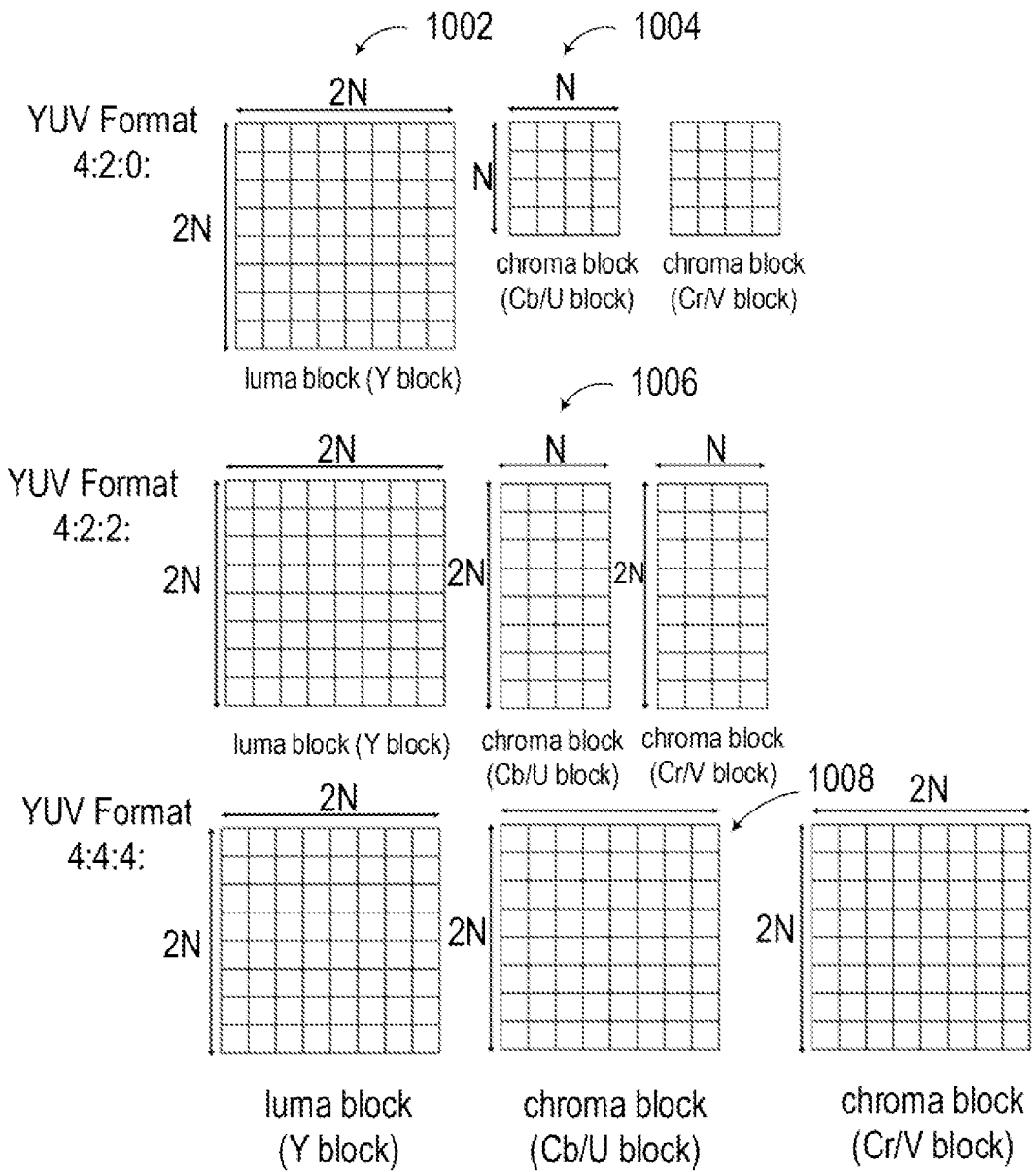
FIG. 10 is a schematic diagram illustrating various YUV sampling formats in accordance with some implementations of the present disclosure.

In this disclosure, the term 'unit' defines a region of an image covering all components; and the term 'block' is used to define a region covering a particular component (e.g. luma), and may differ in spatial location when considering the chroma sampling format such as 4:2:0. As shown in the FIG. 10, when the yuv4:2:0 format is used, a 2N×2N block 1002 may include a 2N×2N luma pixels (samples) and two N×N chroma pixels 1004; when the yuv4:2:2 format is used, a 2N×2N block 1002 may include a 2N×2N luma pixels (samples) and two N×2N chroma pixels 1006; when the yuv4:4:4 format is used, a 2N×2N block 1002 may include a 2N×2N luma pixels (samples) and two 2N×2N chroma pixels 1008. In this disclosure, references to a luma block and its corresponding chroma blocks, or vice versa, are reference to the correspondences as shown in the FIG. 10.

Figure 11:
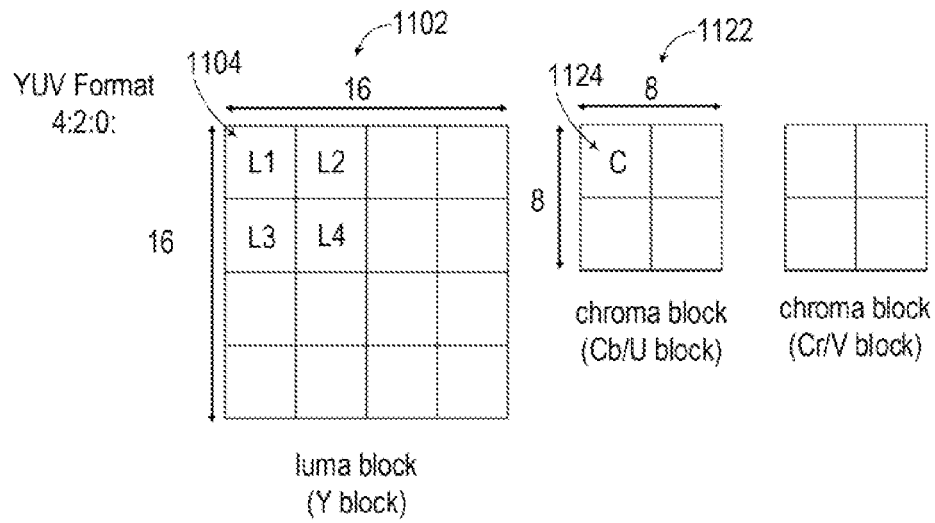
FIG. 11 is a schematic diagram illustrating a correspondence between luma subblocks (L1, L2, L3, and L4) and a chroma subblock C under YUV format 4:2:0 in accordance with some implementations of the present disclosure.

As illustrated in FIG. 11, in some schemes, a block may be partitioned into subblocks and the partitioning may not be equally applied to luma and chroma blocks. For example, as shown in FIG. 11, under the yuv4:2:0 format, an 16×16 luma block 1102 may be partitioned into sixteen 4×4 subblocks 1104; while each of its corresponding 8×8 chroma blocks 1122 is partitioned into four 4×4 chroma subblocks 1124. Accordingly, each 4×4 chroma subblock, e.g., chroma subblock C, corresponds to four 4×4 luma subblocks, e.g. luma subblocks L1, L2, L3, and L4.

Accordingly, the video data is arranged in a plurality of luma subblocks and a plurality of chroma subblocks, wherein each chroma subblock corresponds to one or more luma subblocks.

FIG. 1 is a block diagram illustrating an exemplary system 10 for encoding and decoding video blocks in accordance with some implementations of the present disclosure. As shown in FIG. 1, the system 10 includes a source device 12 that generates and encodes video data which is to be decoded at a later time by a destination device 14. The source device 12 and the destination device 14 may be any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may be any type of communication medium or device capable of moving the encoded video data from the source device 12 to the destination device 14. In one example, the link 16 may be a communication medium to enable the source device 12 to transmit the encoded video data directly to the destination device 14 in real-time. The encoded video data may be modulated according to a communication standard, such as a wireless communication protocol, and transmitted to the destination device 14. The communication medium may be any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing encoded video data and transmitting the encoded video data to the destination device 14. Exemplary file servers include a web server (e.g., for a website), an FTP server, network attached storage (NAS) devices, or a local disk drive. The destination device 14 may access the encoded video data through any standard data connection, including a wireless channel (e.g., a Wi-Fi connection), a wired connection (e.g., DSL, cable modem, etc.), or a combination of both which is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera of a security surveillance system, the source device 12 and the destination device 14 may be camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes an input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored a file server.

In some implementations, the destination device 14 may include the display device 34, which may be an integrated display device or an external display device that is configured to communicate with the destination device 14. The display device 34 displays the decoded video data to a user, and may be any of a variety of display devices such as a liquid crystal display (LCD), a plasma display, an organic light emitting diode (OLED) display, or another type of display device.

The video encoder 20 and the video decoder 30 may operate according to proprietary or industry standards, such as VVC, HEVC, MPEG-4, Part 10, Advanced Video Coding (AVC), or extensions of such standards. It should be understood that the present disclosure is not limited to a specific video coding/decoding standard and may be applicable to other video coding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
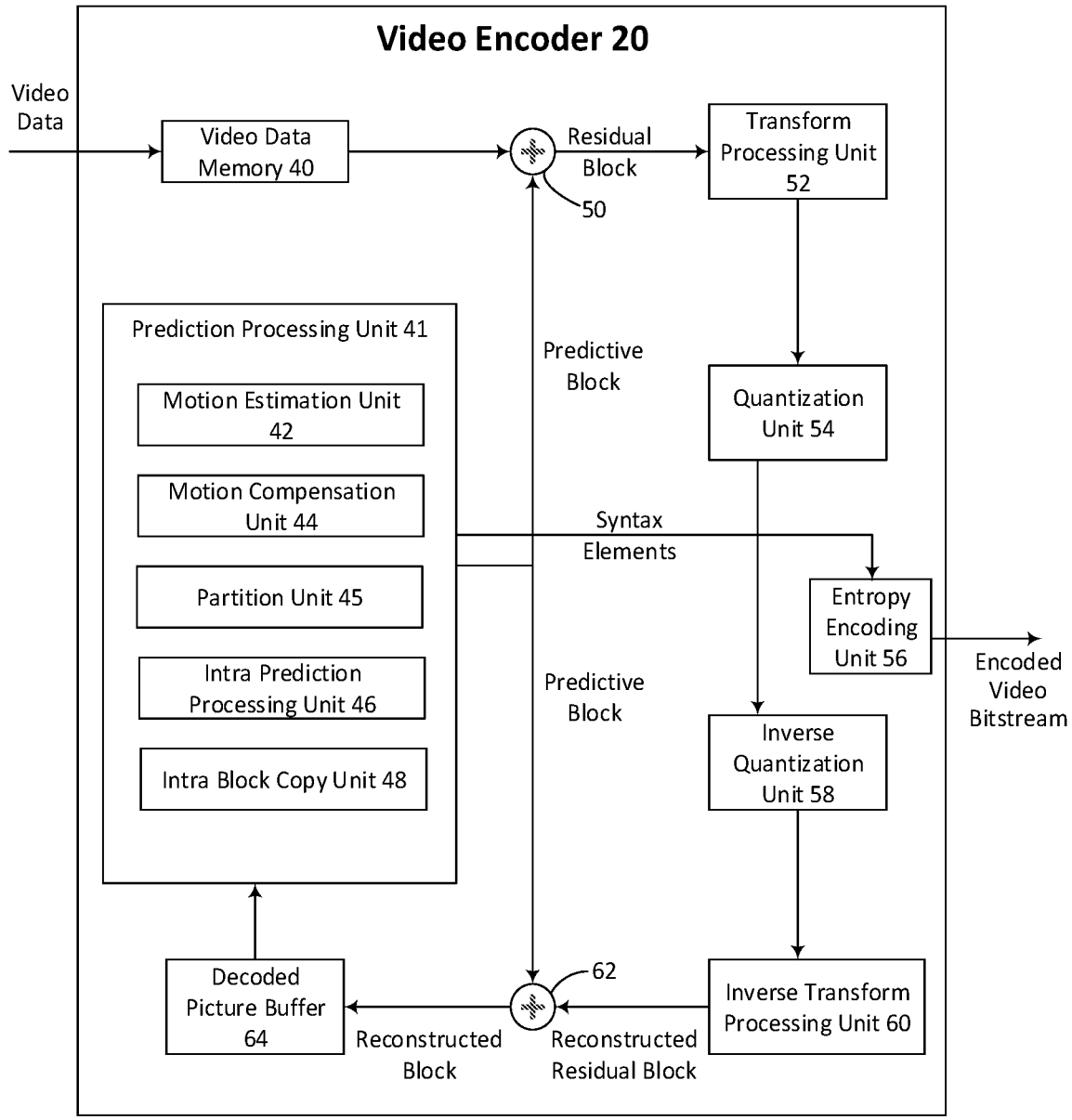
FIG. 2 is a block diagram illustrating an exemplary video encoder in accordance with some implementations of the present disclosure.

FIG. 2 is a block diagram illustrating an exemplary video encoder 20 in accordance with some implementations described in the present disclosure. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, the video encoder 20 includes a video data memory 40, a prediction processing unit 41, a decoded picture buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra block copy (BC) unit 48. In some implementations, the video encoder 20 also includes an inverse quantization unit 58, an inverse transform processing unit 60, and a summer 62 for video block reconstruction. A deblocking filter (not shown) may be positioned between the summer 62 and the DPB 64 to filter block boundaries to remove blockiness artifacts from a reconstructed video. An in loop filter (not shown) may also be used in addition to the deblocking filter to filter the output of summer 62. The video encoder 20 may take the form of a fixed or programmable hardware unit or may be divided among one or more of the fixed or programmable hardware units.

The video data memory 40 may store video data to be encoded by the components of the video encoder 20. The video data in the video data memory 40 may be obtained, for example, from the video source 18. The DPB 64 is a buffer that stores reference video data for use in encoding video data by the video encoder 20 (e.g., in intra or inter predictive coding modes). The video data memory 40 and DPB 64 may be any of a variety of memory devices. In various examples, the video data memory 40 may be on-chip with other components of the video encoder 20, or off-chip relative to those components.

As shown in FIG. 2, after receiving video data, the partition unit 45 within the prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of the video data.

In some implementations, the motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions, and output a motion vector with fractional pixel precision.

The motion estimation unit 42 calculates a motion vector for a PU of a video block in an inter prediction coded frame by comparing the position of the PU to the position of a predictive block of a reference frame selected from a first reference frame list (e.g., List0) or a second reference frame list (e.g., List1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the PU of the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but they are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. The intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for intra BC prediction according to the implementations described herein. In either case, for intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to the intra prediction, or a different frame according to the inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode select unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more transform units (TUs) and is provided to the transform processing unit 52. The transform processing unit 52 transforms the residual video data into residual transform coefficients using a transform, such as a discrete cosine transform (DCT) or a conceptually similar transform.

The transform processing unit 52 may send the resulting transform coefficients to the quantization unit 54. The quantization unit 54 quantizes the transform coefficients to further reduce bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to the video decoder 30, or archived in the storage device 32 for later transmission to or retrieval by the video decoder 30.

The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
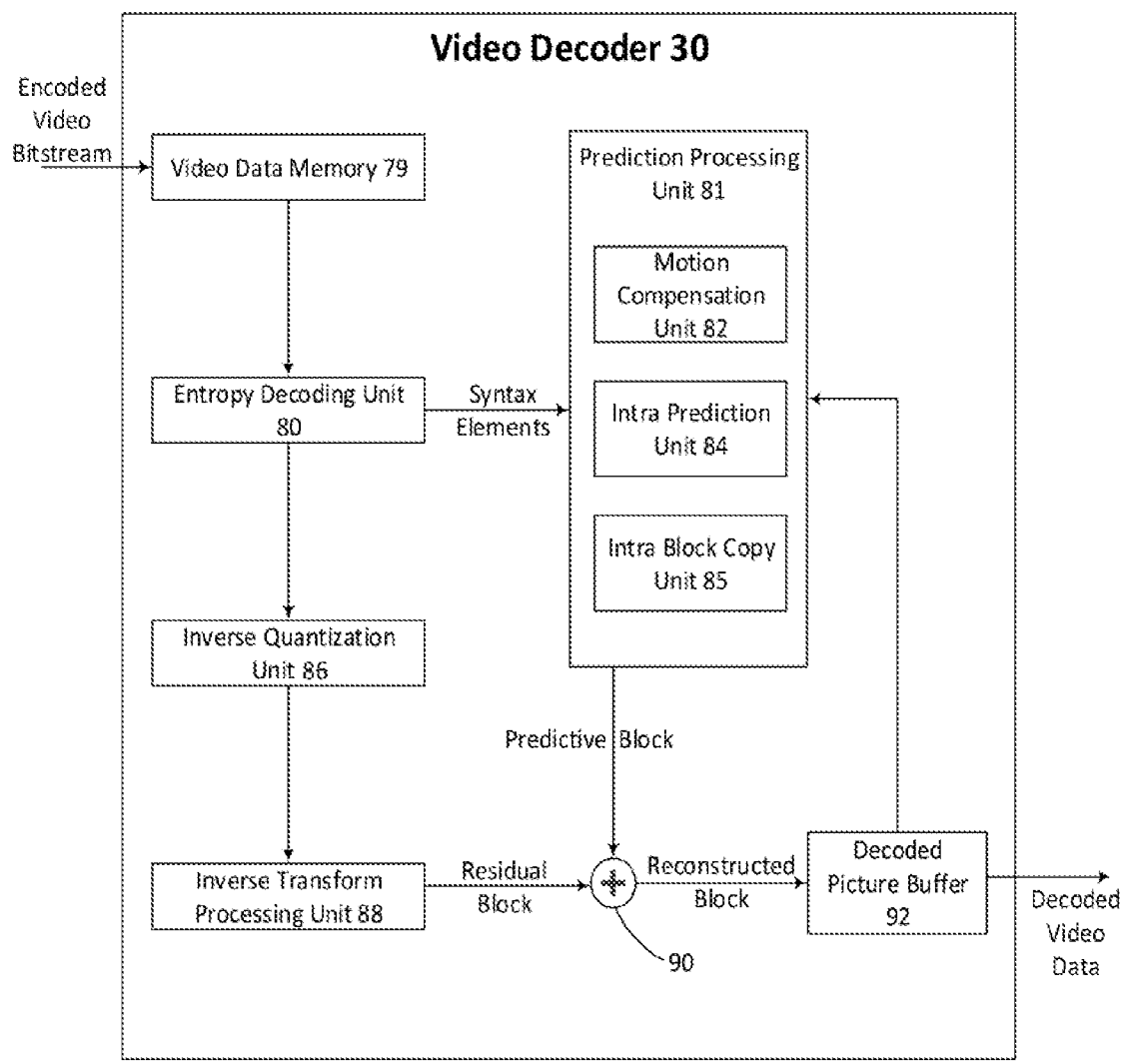
FIG. 3 is a block diagram illustrating an exemplary video decoder in accordance with some implementations of the present disclosure.

FIG. 3 is a block diagram illustrating an exemplary video decoder 30 in accordance with some implementations of the present disclosure. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present disclosure. Also, in some examples, the implementations of the present disclosure may be divided among one or more of the units of the video decoder 30. For example, the intra BC unit 85 may perform the implementations of the present disclosure, alone, or in combination with other units of the video decoder 30, such as the motion compensation unit 82, the intra prediction unit 84, and the entropy decoding unit 80. In some examples, the video decoder 30 may not include the intra BC unit 85 and the functionality of the intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a coded picture buffer (CPB) that stores encoded video data from an encoded video bitstream. The decoded picture buffer (DPB) 92 of video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List0 and List1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter (not pictured) may be positioned between the summer 90 and the DPB 92 to further process the decoded video block. The decoded video blocks in a given frame are then stored in the DPB 92, which stores reference frames used for subsequent motion compensation of next video blocks. The DPB 92, or a memory device separate from the DPB 92, may also store the decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4:
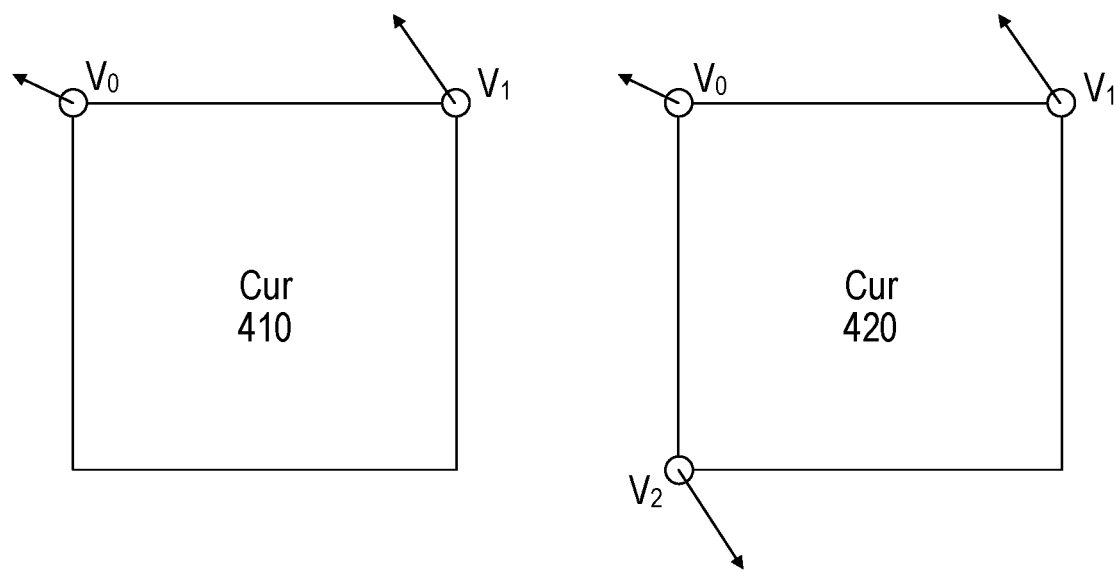
FIG. 4 is a schematic diagram illustrating a control point based affine motion model in accordance with some implementations of the present disclosure.

FIG. 4 is a schematic diagram illustrating a control point based affine motion model in accordance with some implementations of the present disclosure. In the HEVC, only translation motion model is applied for motion compensation prediction (MCP). However, in the real world, there are many kinds of motions, e.g. zoom in/out, rotation, perspective motions and the other irregular motions. In the VTM3, a block-based affine transform motion compensation prediction is applied. As shown in FIG. 4, the affine motion field of the block is described by motion information of two control point (4-parameter) or three control point motion vectors (6-parameter).

For 4-parameter affine motion model 410, the motion vector at a sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (1)$$

For 6-parameter affine motion model 420, the motion vector at a sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

Where $(mv_{0x}, mv_{0y})$ is the motion vector of the top-left corner control point, $(mv_{1x}, mv_{1y})$ is the motion vector of the top-right corner control point, and $(mv_{2x}, mv_{2y})$ is the motion vector of the bottom-left corner control point.

Figure 5:
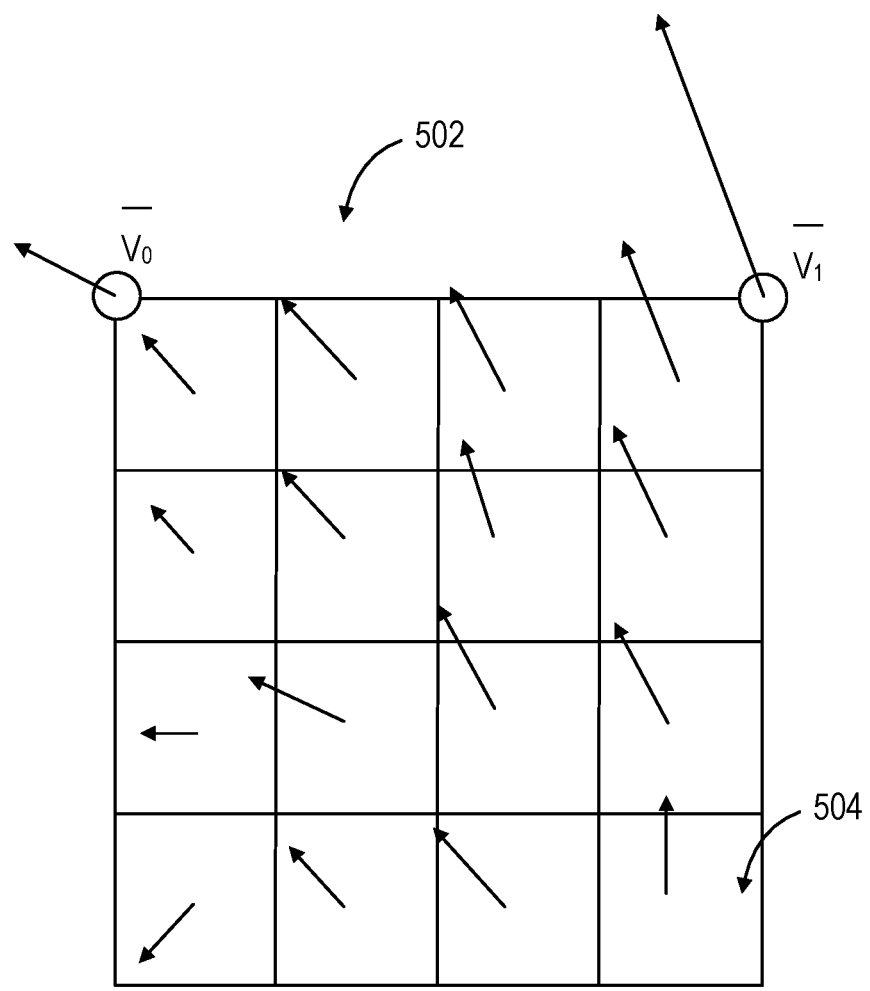
FIG. 5 is a schematic diagram illustrating an affine Motion Vector Field (MVF) per subblock for a block in accordance with some implementations of the present disclosure.

FIG. 5 is a schematic diagram illustrating an affine Motion Vector Field (MVF) per subblock 504 for a block 502 in accordance with some implementations of the present disclosure. In order to simplify the motion compensation prediction, block based affine transform prediction is applied. To derive the motion vector of each 4×4 luma subblock, the motion vector of the center sample of each subblock, as shown in FIG. 5, is calculated according to the above equations, and rounded to 1/16 fraction accuracy. Then the motion compensation interpolation filters are applied to generate the prediction of each subblock with derived motion vector. The subblock size of chroma-components is also set to be 4×4. The motion vector (MV) of a 4×4 chroma subblock is calculated as the average of the MVs of the four corresponding 4×4 luma subblocks.

In some implementations, an affine motion may be derived using the following process:

In stage 1: the MV of the top-left control point, i.e. $mv_{0x}$ and $mv_{0y}$ in equations (1) and (2) are left-shifted by 7 to be represented in higher precision for affine MV derivation, as shown in the equations (3) and (4) below. Here, cpMvLX[cpIdx][c] represents the component c (c=0 means the horizontal component and c=1 means the vertical component) of the List X (X could be 0 or 1) MV of the control point cpIdx (cpIdx=0 means the top-left control point, cpIdx=1 means the top-right control point and cpIdx=2 means the bottom-left control point).

$$mvScaleHor = cpMvLX[0][0] << 7 \quad (3)$$

$$mvScaleVer = cpMvLX[0][1] << 7 \quad (4)$$

In stage 2: the differences between affine parameters $mv_{1x}-mv_{0x}$, $mv_{1y}-mv_{0y}$, $mv_{2x}-mv_{0x}$ and $mv_{2y}-mv_{0y}$ are also left-shifted by 7 and then divided by the block width or height, which could be realized by bit-shift operation as follows:

$$dHorX = (cpMvLX[1][0] - cpMvLX[0][0]) << (7 - \log 2CbW) \quad (5)$$

$$dVerX = (cpMvLX[1][1] - cpMvLX[0][1]) << (7 - \log 2CbW) \quad (6)$$

$$dHorY = (cpMvLX[2][0] - cpMvLX[0][0]) << (7 - \log 2CbH) \quad (7)$$

$$dVerY = (cpMvLX[2][1] - cpMvLX[0][1]) << (7 - \log 2CbH) \quad (8)$$

Here, the lower-case x of the affine parameters (e.g. $mv_{1x}$-$mv_{0x}$) represent the x component (or termed the horizontal component) while y represent the y component (or termed the vertical component). The capital X in the equations (3) to (8) is a variable to indicate the list 0 MV or list 1 MV (X could be 0 or 1).

The luma motion vector mvLX[xSbIdx][ySbIdx] for each luma subblock is derived as follows, using a control point based affine motion model. The xSbIdx and ySbIdx are the horizontal and vertical indices of the subblocks, respectively; and xPosCb and yPosCb are the horizontal and vertical coordinates of the center sample of the associated subblock.

$$xPosCb=2+(xSbIdx<<2) \qquad (9)$$

$$yPosCb=2+(ySbIdx<<2) \qquad (10)$$

$$mvLX[xSbIdx][ySbIdx][0]=(mvScaleHor+ dHorX*xPosCb+dHorY*yPosCb) \qquad (11)$$

$$mvLX[xSbIdx][ySbIdx][1]=(mvScaleVer+ dVerX*xPosCb+dVerY*yPosCb) \qquad (12)$$

After the affine MVs are derived, they are right-shifted by 7 bits to be represented at the original precision.

As done for translational motion inter prediction, there are also two affine motion inter prediction modes: affine merge mode and affine AMVP mode.

Affine merge mode may be applied for CUs with both width and height larger than or equal to 8. In this mode, the CPMVs of the current CU is generated based on the motion information of the spatial neighboring CUs. There can be up to five CPMVP candidates and an index is signaled to indicate the one to be used for the current CU. The following three types of CPMV candidate are used to form the affine merge candidate list:
1) Inherited affine merge candidates that extrapolated from the CPMVs of the neighboring CUs;
2) Constructed affine merge candidates CPMVPs that are derived using the translational MVs of the neighboring CUs; and
3) Zero MVs.

Figure 6:
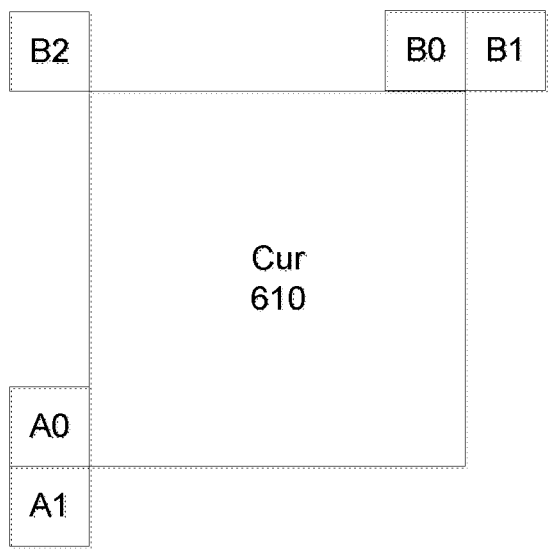
FIG. 6 is a schematic diagram illustrating locations of inherited affine motion predictors in accordance with some implementations of the present disclosure.

FIG. 6 is a schematic diagram illustrating locations of inherited affine motion predictors in accordance with some implementations of the present disclosure. In the VTM3, there are maximum two inherited affine candidates, which are derived from affine motion model of the neighboring blocks, one from left neighboring CUs and one from above neighboring CUs. The candidate blocks of the current CU 610 are shown in FIG. 6. For the left predictor, the scan order is A0->A1, and for the above predictor, the scan order is B0->B1->B2. Only the first inherited candidate from each side is selected. No pruning check is performed between two inherited candidates.

Figure 7:
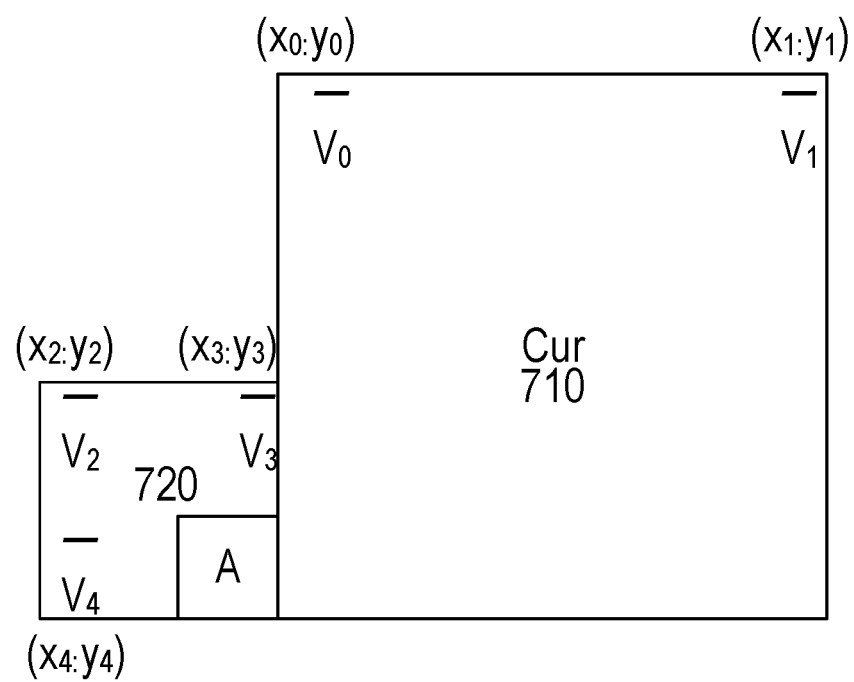
FIG. 7 is a schematic diagram illustrating control point motion vector inheritance in accordance with some implementations of the present disclosure.

FIG. 7 is a schematic diagram illustrating control point motion vector inheritance in accordance with some implementations of the present disclosure. When a neighboring affine CU 720 is identified, its control point motion vectors are used to derived the CPMVP candidate in the affine merge list of the current CU 710. As shown in FIG. 7, if the neighboring left bottom block A is coded in affine mode, the motion vectors $v_2$, $v_3$ and $v_4$ of the top left corner, above right corner and left bottom corner of the CU 720 which contains the block A are attained. When the block A is coded with 4-parameter affine model, the two CPMVs of the current CU 710 are calculated according to $v_2$, and $v_3$. In case that the block A is coded with 6-parameter affine model, the three CPMVs of the current CU 710 are calculated according to $v_2$, $v_3$ and $v_4$.

Figure 8:
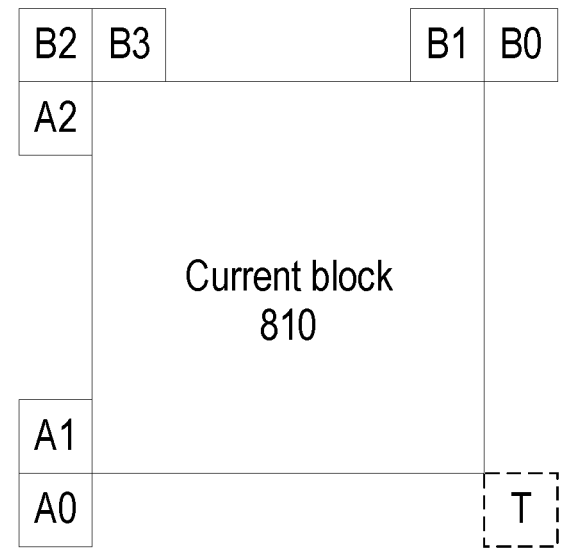
FIG. 8 is a schematic diagram illustrating locations of candidate's position for constructed affine merge mode in accordance with some implementations of the present disclosure.

FIG. 8 is a schematic diagram illustrating locations of candidate's position for constructed affine merge mode in accordance with some implementations of the present disclosure. Constructed affine candidate means that the candidate is constructed by combining the neighbor translational motion information of each control point. The motion information for the control points is derived from the specified spatial neighbors and temporal neighbor shown in FIG. 8. $CPMV_k$ (k=1, 2, 3, 4) represents the k-th control point of the current block 810. For $CPMV_1$, the B2->B3->A2 blocks are checked and the MV of the first available block is used. For $CPMV_2$, the B1->B0 blocks are checked; and for $CPMV_3$, the A1->A0 blocks are checked. For TMVP, it is used as $CPMV_4$ if available.

After the MVs of the four control points are attained, affine merge candidates are constructed based on the motion information. The following combinations of control point MVs are used to construct in order:
{$CPMV_1$, $CPMV_2$, $CPMV_3$},
{$CPMV_1$, $CPMV_2$, $CPMV_4$},
{$CPMV_1$, $CPMV_3$, $CPMV_4$},
{$CPMV_2$, $CPMV_3$, $CPMV_4$},
{$CPMV_1$, $CPMV_2$}, and
{$CPMV_1$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of the control points are different, the related combination of control point MVs is discarded.

Affine AMVP mode can be applied for CUs with both width and height larger than or equal to 16. An affine flag in CU level is signaled in the bitstream to indicate whether affine AMVP mode is used and then another flag is signaled to indicate whether 4-parameter affine or 6-parameter affine. In this mode, the difference between the CPMVs of current CU and their predictors CPMVPs is signaled in the bitstream. The affine AVMP candidate list size is 2 and it is generated by using the following four types of CPVM candidate in order:
1) Inherited affine AMVP candidates that extrapolated from the CPMVs of the neighboring CUs;
2) Constructed affine AMVP candidates CPMVPs that are derived using the translational MVs of the neighboring CUs;
3) Translational MVs from neighboring CUs; and
4) Zero MVs.

The checking order of inherited affine AMVP candidates is the same as the checking order of inherited affine merge candidates. The only difference is that, for AVMP candidate, only the affine CU that has the same reference picture as in the current block is considered. No pruning process is applied when inserting an inherited affine motion predictor into the candidate list.

Constructed AMVP candidate is only derived from the specified spatial neighbors shown in FIG. 8. The same checking order is used as that is done in the affine merge candidate construction. In addition, reference picture index of the neighboring block is also checked. The first block in the checking order that is inter coded and has the same reference picture as in current CUs is used.

If all three CPMVs are attached, they will be inserted into the affine AMVP list as they are. If only $mv_0$ and $mv_1$ are available, $mv_2$ is derived as follows:

$$mv_{2x} = mv_{0x} - h\frac{(mv_{1y} - mv_{0y})}{w}, mv_{2y} = mv_{0y} + h\frac{(mv_{1x} - mv_{0x})}{w} \quad (13)$$

where the current CU size is w×h. If only $mv_0$ and $mv_2$ are available, $mv_1$ is derived as follows:

$$mv_{1x} = mv_{0x} + h\frac{(mv_{2y} - mv_{0y})}{w}, mv_{1y} = mv_{0y} - h\frac{(mv_{2x} - mv_{0x})}{w} \quad (14)$$

After the inherited affine AMVP and constructed affine AVMP are derived and inserted into the affine AMVP list, if the size of the affine AMVP list is still less than 2, the Affine AMVP list will be filled up by the translational MVs ($mv_0$, $mv_1$ or $mv_2$) which means all the control point MVs are predicted by either $mv_0$, $mv_1$ or $mv_2$. Accordingly, if the number of the affine AMVP list candidates is less than 2, $mv_0$, $mv_1$ and $mv_2$ will be added in order. The translational MVs are used to predict all control point MVs of the current CU, when available.

In VTM3, the CPMVs of affine CUs are stored in a separate buffer. The stored CPMVs are only used to generate the inherited CPMVPs in affine merge mode and affine AMVP mode for the lately coded CUs. The subblock MVs derived from the CPMVs are used for motion compensation, MV derivation of merge/AMVP list of translational MVs and de-blocking.

Figure 9:
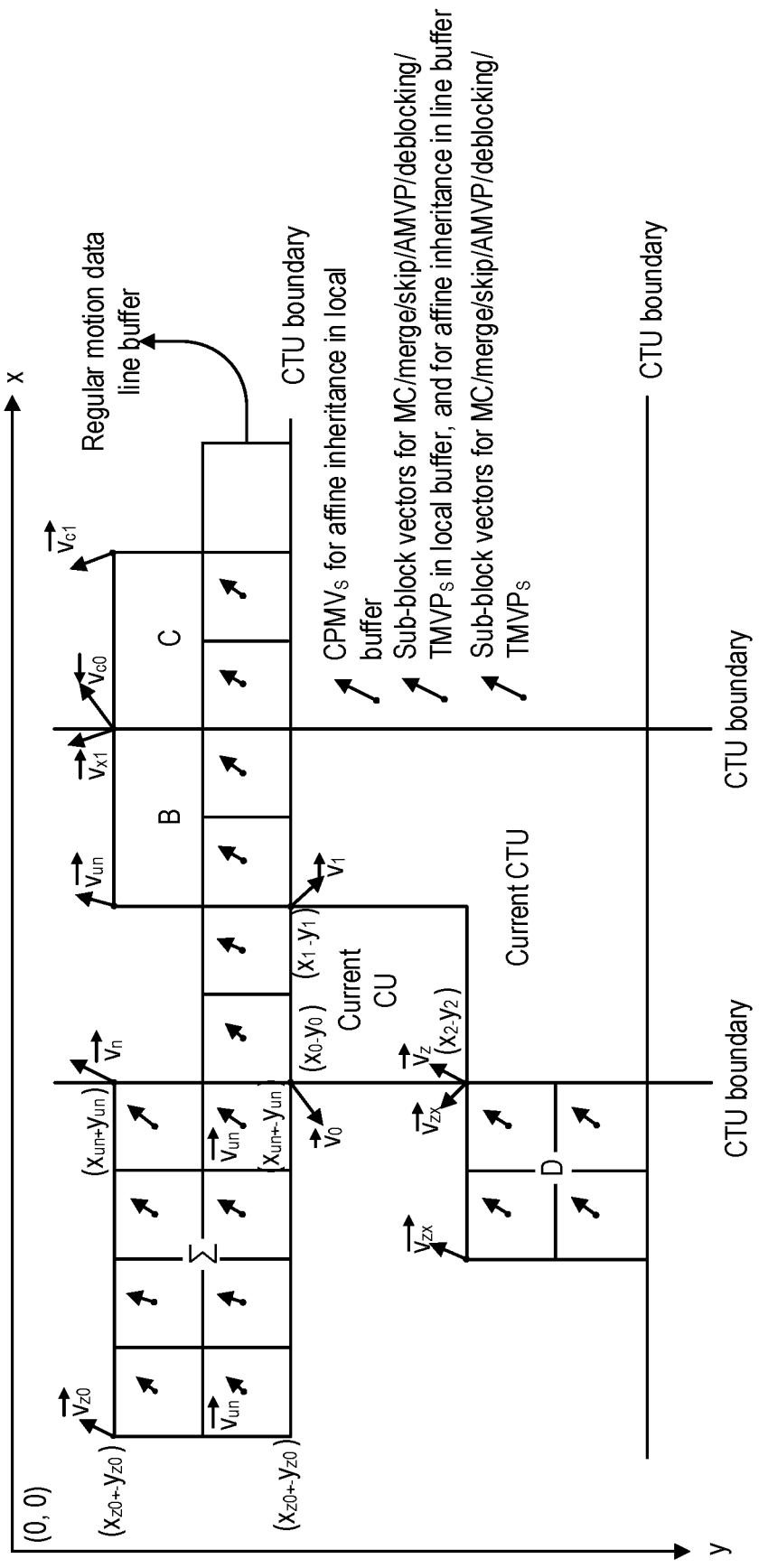
FIG. 9 is a schematic diagram illustrating motion vector usage for a proposed combined method in accordance with some implementations of the present disclosure.

FIG. 9 is a schematic diagram illustrating motion vector usage for a proposed combined method in accordance with some implementations of the present disclosure. To avoid the picture line buffer for the additional CPMVs, affine motion data inheritance from the CUs from above CTU is treated differently from the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in the local buffer. If the candidate CU is 6-parameter affine coded, the affine model is degraded to 4-parameter model. As shown in FIG. 9, along the top CTU boundary, the bottom-left and bottom-right subblock motion vectors of a CU are used for affine inheritance of the CUs in bottom CTUs.

The following describes an example of affine prediction with 4×4 subblocks for chroma components, where yuv 4:2:0 format is used, that is, each 4×4 chroma subblock corresponds to four 4×4 luma subblocks. In one example, the minimum subblock size of chroma components is always set to be 4×4. The MV of a 4×4 chroma subblock is calculated as the average of the MVs of the four corresponding 4×4 luma subblocks. As shown below, the MV for each chroma 4×4 block is derived using the averaged MV of the four MVs from the four corresponding luma blocks. The four luma MVs are in the original precision, not in the high precision (e.g. left-shifted by 7). A decoding process of averaging the rounded luma MVs is illustrated below.

Once the luma motion vector mvLX[xSbIdx][ySbIdx] is derived based on equations (9) to (12), a rounding process for the motion vector is invoked with mvX set equal to mvLX[xSbIdx][ySbIdx], rightShift set equal to 7, and left-Shift set equal to 0 as inputs and the rounded mvLX[xSbIdx][ySbIdx] as output.

An example of the rounding process for a motion vector mvX is provided with the following equations (15) to (17). Here, inputs to this process are: the motion vector mvX; the right shift parameter rightShift for rounding; and the left shift parameter leftShift for resolution increase. Output of this process is the rounded motion vector mvX. For the rounding of mvX, the following applies:

$$\text{offset} = (\text{rightShift} == 0) ? 0 : (1 << (\text{rightShift} - 1)) \quad (15)$$

$$mvX[0] = ((mvX[0] + \text{offset} - (mvX[0] >= 0)) >> \text{rightShift}) << \text{leftShift} \quad (16)$$

$$mvX[1] = ((mvX[1] + \text{offset} - (mvX[1] >= 0)) >> \text{rightShift}) << \text{leftShift} \quad (17)$$

The average luma motion vector mvAvgLX is derived as follows with equation (18). In some examples, an affine motion vector for a luma subblock out of the luma subblocks may be derived using a control point based affine motion model. In some other examples, the affine motion vector for each one of the luma subblocks may be derived using the control point based affine motion model.

$$\begin{aligned}mvAvgLX = &(mvLX[(xSbIdx>><<1)][(ySbIdx>><<1)] + \\&mvLX[(xSbIdx>>1<<1)+1][(ySbIdx>>1<<1)] + \\&mvLX[(xSbIdx>>1<<1)][(ySbIdx>>1<<1)+1] + \\&mvLX[(xSbIdx>>1<<1)+1][(ySbIdx>>1<<1)+1] + \\&2)>>2\end{aligned} \quad (18)$$

A derivation process for chroma motion vectors is invoked with mvAvgLX as input, and the chroma motion vector mvCLX[xSbIdx][ySbIdx] as output.

An example of the derivation process for a chroma motion vector based on a luma motion vector mvLX is provided with the following equations (19) and (20). Here, inputs to this process are: a luma motion vector in 1/16 fractional-sample accuracy mvLX; and a reference index refIdxLX. Output of this process is a chroma motion vector in 1/32 fractional-sample accuracy mvCLX. A chroma motion vector is derived from the corresponding luma motion vectors. The chroma motion vector mvCLX, is derived as follows:

$$mvCLX[0] = mvLX[0]*2/\text{SubWidthC} \quad (19)$$

$$mvCLX[1] = mvLX[1]*2/\text{SubHeightC} \quad (20)$$

The variables SubWidthC and SubHeightC may be specified depending on the chroma format sampling structure, which is specified through chroma_format_idc and separate_colour_plane_flag. One example is provided in the table below:

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Other values of chroma_format_idc, SubWidthC and SubHeightC may be specified in the future.

The average of four corresponding 4×4 luma subblocks may result in different MVs which are derived using the affine motion model for that chroma 4×4 block. When a user wants to derive the affine MVs for a 4×4 chroma block, the MVs of the corresponding luma blocks have to be generated using the affine motion model and then rounded to the MV precision (e.g. 1/16-pel) to perform motion compensation. The rounded MVs are then averaged to obtain the MVs for the 4×4 chroma block.

That is, in deriving the affine motion for each luma subblock, the deriving process is done in higher precision (i.e. the MVs of the control points are first left-shift by 7, as shown in equations (3) and (4), which means the MVs are multiplied by 128). The high precision control point MVs are then used to derive the affine MVs for each luma subblock. After the MV is derived for each luma subblock, it is right-shift by 7 to its original precision, for example using the rounding process of equations (15) to (17).

In this disclosure, "high precision" and "higher precision" are used interchangeably to mean that a motion vector is represented in a left-shifted form, thus having a precision higher than its original form.

In some examples of a proposed scheme, the chroma MV are generated by averaging the four corresponding luma MVs in the high precision during the derivation of affine motion.

For example, once the required luma motion vectors mvLX[xSbIdx][ySbIdx] are derived based on equations (9) to (12), the average luma motion vector mvAvgLX is derived, using the equation (18) directly with each of the luma motion vectors, without invoking the rounding process for the individual luma motion vectors. Accordingly, a high precision average luma motion vector mvAvgLX may be obtained.

In some examples, the rounding process of equations (15) to (17) for motion vectors is then invoked with the result of the averaging equation (18), i.e. having mvX set equal to mvAvgLX, rightShift set equal to 7, and leftShift set equal to 0 as inputs, and the rounded mvAvgLX as output. The derivation process of equations (19) and (20) for chroma motion vectors is subsequently invoked with the rounded mvAvgLX as input, and the chroma motion vector mvCLX [xSbIdx][ySbIdx] as output.

In some other examples, the derivation process of equations (19) and (20) for chroma motion vectors may be invoked prior to the rounding process of equations (15) to (17). That is, in the process of deriving chroma motion vectors, the high precision luma MVs, instead of the luma MV in the original precision, are used. For example, once the high precision average luma motion vector mvAvgLX is obtained, the derivation process of equations (19) and (20) may be invoked, with the high precision average luma motion vector mvAvgLX (without the rounding process performed) as input, and the chroma motion vector mvCLX [xSbIdx][ySbIdx] in the high precision as output. The high precision chroma motion vector may then be right-shifted by 7 bits to be represented in the original precision, using the rounding process for example.

According to different yuv sub-sampling format (e.g. yuv 4:4:4, 4:2:0 or 4:2:2), the sampling positions between luma and chroma samples are different and the 4×4 chroma block may correspond to different luma blocks. Therefore, the averaging process may use the MVs from different luma blocks under different yuv sub-sampling formats. For example, when yuv 4:2:0 format is used, the following process applies:

$$mvAvgLX=(mvLX[(xSbIdx>>1<<1)][(ySbIdx>>1<<1)]+mvLX[(xSbIdx>>1<<1)+1][(ySbIdx>>1<<1)]+mvLX[(xSbIdx>>1<<1)][(ySbIdx>>1<<1)+1]+mvLX[(xSbIdx>>1<<1)+1][(ySbIdx>>1<<1)+1]+2)>>2 \quad (18a)$$

when yuv 4:2:2 format is used, the following process applies:

$$mvAvgLX=(mvLX[(xSbIdx>>1<<1)][ySbIdx]+mvLX[(xSbIdx>>1<<1)+1][ySbIdx]+1)>>1 \quad (18b)$$

when yuv 4:4:4 format is used, the following process applies:

$$mvAvgLX=mvLX[xSbIdx][ySbIdx] \quad (18c)$$

That is, based on the yuv sub-sampling format of the video data, the equation (18) of the averaging operation may have different forms, as shown in equations (18a) to (18c). That is, each chroma subblock may correspond to one or more luma subblocks.

Thus, it derives an affine motion vector for a chroma subblock out of the chroma subblocks using motion vectors of the corresponding luma subblocks. The video data has a color sub-sampling format, and the corresponding luma subblocks are derived according to the color sub-sampling format.

In some examples of a proposed scheme, the chroma MV may be calculated directly using the affine motion model. The affine motion model is utilized to directly derive the motion vector of the center sample of the 4×4 chroma block. For example, once the required luma motion vectors mvLX [xSbIdx][ySbIdx] are derived based on equations (9) to (12), the chroma motion vector mvCLX[xSbIdx][ySbIdx] is derived as follows:

If (SubWidth$C$ is equal to 2)

$xPosCb=4+((xSbIdx>>1<<1)<<3)$ else $xPosCb=2+(xSbIdx<<2)$

If (SubHeight$C$ is equal to 2)

$yPosCb=4+((ySbIdx>>1<<1)<<3)$ else $yPosCb=2+(ySbIdx)<<2)$ $mvCLX[xSbIdx][ySbIdx][0]=(mvScaleHor+dHorX*xPosCb+dHorY*yPosCb)$ $mvCLX[xSbIdx][ySbIdx][1]=(mvScaleVer+dVerX*xPosCb+dVerY*yPosCb)$ In this case, the chroma motion vectors are directly derived using the affine motion model. It does not invoke the averaging operation of equation (18), or equations (18a) to (18c), on the corresponding luma motion vectors for the derivation of the chroma motion vectors. The derivation process of equations (19) and (20) may not be required as well.

In some other examples, a control variable deriveChromaFlag may be set for the derivation process for motion vector arrays from affine control point motion vectors. The derivation process for luma motion vectors and chroma motion vectors may be incorporated in a same process block. For example, a motion vector may be derived as follows:

if (SubWidth$C$ is equal to 2 and deriveChromaFlag is equal to 1)

$xPosCb=4+((xSbIdx>>1<<1)<<3)$ else $xPosCb=2+(xSbIdx<<2)$ if (SubHeight$C$ is equal to 2 and deriveChromaFlag is equal to 1)

$yPosCb=4+((ySbIdx>>1<<1)<<3)$ else $yPosCb=2+(ySbIdx<<2)$ $mvX[xSbIdx][ySbIdx][0]=(mvScaleHor+ dHorX*xPosCb+dHorY*yPosCb)$ $mvX[xSbIdx][ySbIdx][1]=(mvScaleVer+ dVerX*xPosCb+dVerY*yPosCb)$ In this case, the chroma motion vectors are also directly derived using the affine motion model in accordance of the value set for the variable deriveChromaFlag. The resulted mvX[xSbIdx][ySbIdx] may be either a luma motion vector or a chroma motion vector, based on the values of Sub-WidthC, SubHeightC, and deriveChromaFlag. Neither the averaging operation of equation (18), or equations (18a) to (18c), on the corresponding luma motion vectors, nor the derivation process of equations (19) and (20), is required to be invoked.

Figure 12:
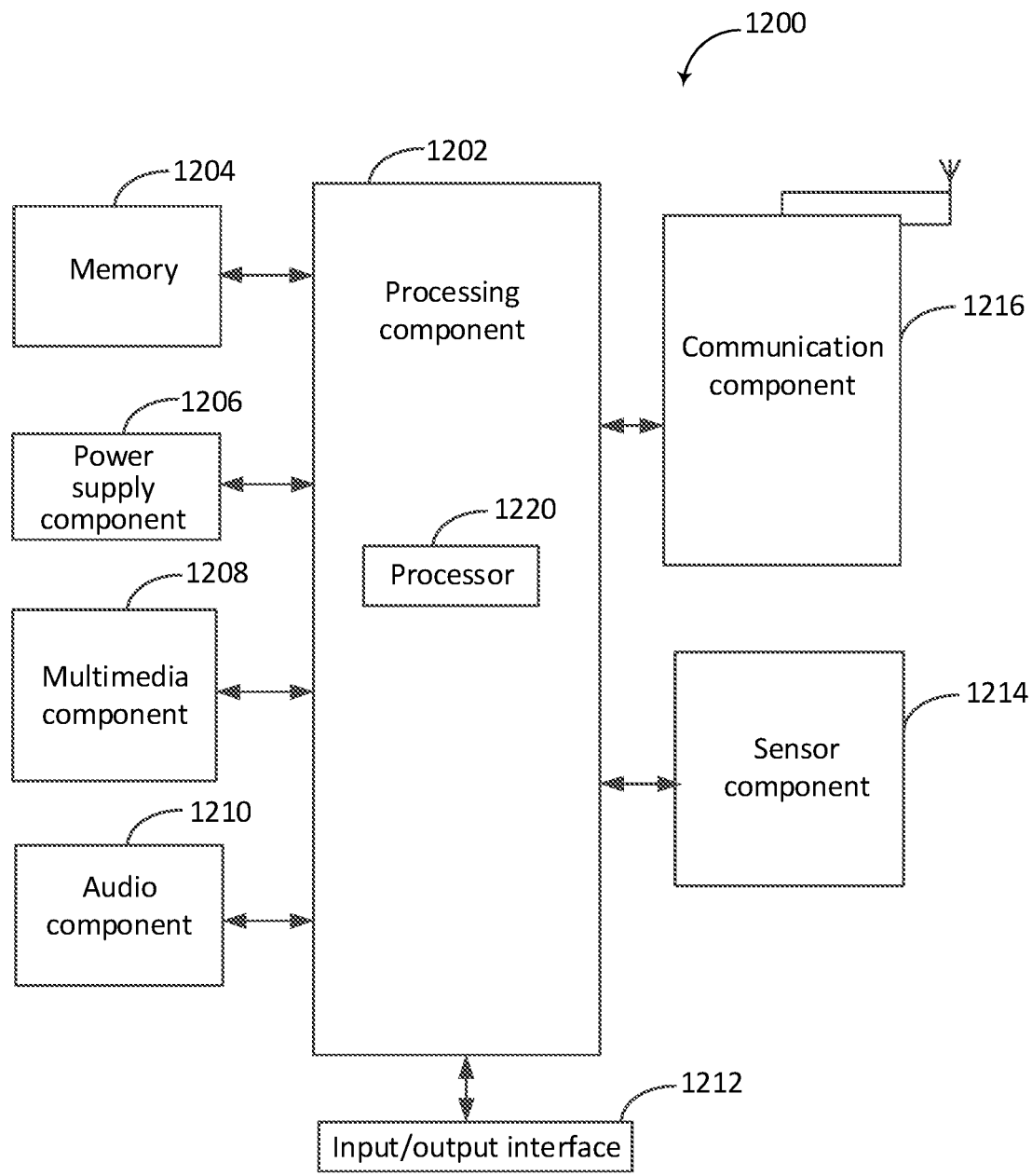
FIG. 12 is a block diagram illustrating an exemplary apparatus for video coding in accordance with some implementations of the present disclosure.

FIG. 12 is a block diagram illustrating an apparatus for video coding in accordance with some implementations of the present disclosure. The apparatus 1200 may be a terminal, such as a mobile phone, a tablet computer, a digital broadcast terminal, a tablet device, or a personal digital assistant.

As shown in FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 usually controls overall operations of the apparatus 1200, such as operations relating to display, a telephone call, data communication, a camera operation and a recording operation. The processing component 1202 may include one or more processors 1220 for executing instructions to complete all or a part of steps of the above method. Further, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store different types of data to support operations of the apparatus 1200. Examples of such data include instructions, contact data, phonebook data, messages, pictures, videos, and so on for any application or method that operates on the apparatus 1200. The memory 1204 may be implemented by any type of volatile or non-volatile storage devices or a combination thereof, and the memory 1204 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1206 supplies power for different components of the apparatus 1200. The power supply component 1206 may include a power supply management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1208 may include a front camera and/or a rear camera. When the apparatus 1200 is in an operation mode, such as a shooting mode or a video mode, the front camera and/or the rear camera may receive external multimedia data.

The audio component 1210 is configured to output and/or input an audio signal. For example, the audio component 1210 includes a microphone (MIC). When the apparatus 1200 is in an operating mode, such as a call mode, a recording mode and a voice recognition mode, the microphone is configured to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, a button, or the like. These buttons may include but not limited to, a home button, a volume button, a start button and a lock button.

The sensor component 1214 includes one or more sensors for providing a state assessment in different aspects for the apparatus 1200. For example, the sensor component 1214 may detect an on/off state of the apparatus 1200 and relative locations of components. For example, the components are a display and a keypad of the apparatus 1200. The sensor component 1214 may also detect a position change of the apparatus 1200 or a component of the apparatus 1200, presence or absence of a contact of a user on the apparatus 1200, an orientation or acceleration/deceleration of the apparatus 1200, and a temperature change of apparatus 1200. The sensor component 1214 may include a proximity sensor configured to detect presence of a nearby object without any physical touch. The sensor component 1214 may further include an optical sensor, such as a CMOS or CCD image sensor used in an imaging application. In some examples, the sensor component 1214 may further include an acceleration sensor, a gyroscope sensor, a magnetic sensor, a pressure sensor, or a temperature sensor.

The communication component 1216 is configured to facilitate wired or wireless communication between the apparatus 1200 and other devices. The apparatus 1200 may access a wireless network based on a communication standard, such as WiFi, 4G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1200 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 13:
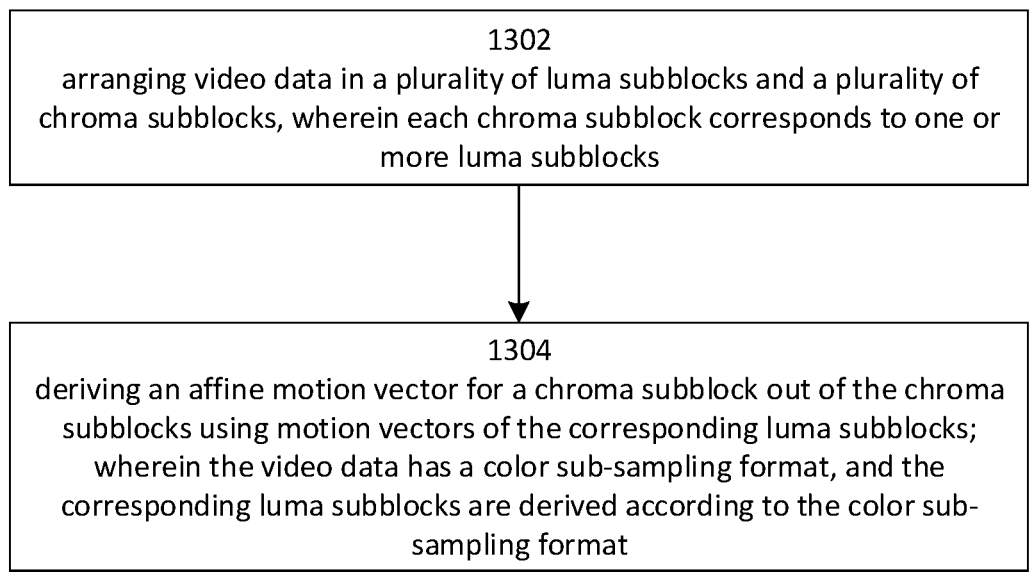
FIG. 13 is a flowchart illustrating an exemplary process of video coding for deriving affine motion vectors for chroma components in accordance with some implementations of the present disclosure.

FIG. 13 is a flowchart illustrating an exemplary process of video coding for deriving affine motion vectors for chroma components in accordance with some implementations of the present disclosure.

In step 1302, the processor 1220 arranges video data in a plurality of luma subblocks and a plurality of chroma subblocks, where each chroma subblock corresponds to one or more luma subblocks.

In step 1304, the processor 1220 derives an affine motion vector for a chroma subblock out of the chroma subblocks using motion vectors of the corresponding luma subblocks; where the video data has a color sub-sampling format, and the corresponding luma subblocks are derived according to the color sub-sampling format.

In some examples, there is provided an apparatus for video coding. The apparatus includes a processor 1220; and a memory 1204 configured to store instructions executable by the processor; where the processor, upon execution of the instructions, is configured to perform a method as illustrated in FIG. 13.

In some other examples, there is provided a non-transitory computer readable storage medium 1204, having instructions stored therein. When the instructions are executed by a processor 1220, the instructions cause the processor to perform a method as illustrated in FIG. 13.

The description of the present disclosure has been presented for purposes of illustration and description, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
arranging video data in a plurality of luma subblocks and a plurality of chroma subblocks, wherein each chroma subblock corresponds to one or more luma subblocks, wherein the video data has a color sampling format, and the plurality of luma subblocks are derived according to the color sampling format;
determining the color sampling format of the video data;
deriving an affine motion vector in an affine Motion Vector Field (MVF) for a chroma subblock out of the plurality of chroma subblocks using an average luma motion vector derived from motion vectors of the corresponding luma subblocks, wherein the motion vectors from different corresponding luma subblocks are used for deriving the average luma motion vector according to different variables corresponding to different color sampling formats, wherein the motion vectors of the corresponding luma subblocks are derived by deriving affine motion vectors for the corresponding luma subblocks based on a control point based affine motion model and invoking a rounding process with the affine motion vectors of the corresponding luma subblocks, rightShift set equal to 7, and leftShift set equal to 0 as inputs, and
wherein the variables comprise a first variable and a second variable according to the color sampling formats, the first variable is SubWidthC indicating width of chroma subblocks and the second variable is SubHeightC indicating height of chroma subblocks,
in response to determining that both of the first variable and the second variable are equal to 1, the average luma motion vector is the motion vector of one corresponding luma subblock without the averaging process, wherein the one corresponding luma subblock is determined as a luma subblock of which the position is the same as that of the chroma subblock, and
in response to determining that the first variable is equal to 2 and the second variable is equal to 1, the average luma motion vector is derived by taking an average of the motion vectors of two corresponding luma subblocks, wherein the two corresponding luma subblocks are luma subblocks of which the horizontal positions are different from that of the chroma subblock and the vertical positions are the same as that of the chroma subblock.

2. The method of claim 1, further comprising:
left shifting the motion vectors of control points of the corresponding luma subblocks; and
deriving the motion vectors of the corresponding luma subblocks by the left shifted motion vectors.

3. An apparatus for video decoding, comprising:
a processor; and
a memory configured to store instructions executable by the processor;
wherein the processor, upon execution of the instructions, is configured to:
arrange video data in a plurality of luma subblocks and a plurality of chroma subblocks, wherein each chroma subblock corresponds to one or more luma subblocks, wherein the video data has a color sampling format, and the plurality of luma subblocks are derived according to the color sampling format;
determine the color sampling format of the video data;
derive an affine motion vector in an affine Motion Vector Field (MVF) for a chroma subblock out of the plurality of chroma subblocks using an average luma motion vector derived from motion vectors of the corresponding luma subblocks, wherein the motion vectors from different corresponding luma subblocks are used for deriving the average luma motion vector according to different variables corresponding to different color sampling formats, wherein the motion vectors of the corresponding luma subblocks are derived by deriving affine motion vectors for the corresponding luma subblocks based on a control point based affine motion model and invoking a rounding process with the affine motion vectors of the corresponding luma subblocks, rightShift set equal to 7, and leftShift set equal to 0 as inputs, and wherein the variables comprise a first variable and a second variable according to the color sampling formats, the first variable is SubWidthC indicating width of chroma subblocks and the second variable is SubHeightC indicating height of chroma subblocks, in response to determining that both of the first variable and the second variable are equal to 1, the average luma motion vector is the motion vector of one corresponding luma subblock without the averaging process, wherein the one corresponding luma subblock is determined as a luma subblock of which the position is the same as that of the chroma subblock, and in response to determining that the first variable is equal to 2 and the second variable is equal to 1, the average luma motion vector is derived by taking an average of the motion vectors of two corresponding luma subblocks, wherein the two corresponding luma subblocks are luma subblocks of which the horizontal positions are different from that of the chroma subblock and the vertical positions are the same as that of the chroma subblock.

4. The apparatus of claim 3, wherein the processor is further configured to: left shift the motion vectors of control points of the corresponding luma subblocks and derive the motion vectors of the corresponding luma subblocks by the left shifted motion vectors.

5. A non-transitory computer readable storage medium, comprising instructions stored therein, wherein, when the instructions are executed by a processor, the instructions cause the processor to perform a method for video decoding and to store the decoded bitstream in the non-transitory computer-readable storage medium, the method for video decoding comprises:

arranging video data in a plurality of luma subblocks and a plurality of chroma subblocks, wherein each chroma subblock corresponds to one or more luma subblocks, wherein the video data has a color sampling format, and the plurality of luma subblocks are derived according to the color sampling format;

determining the color sampling format of the video data;

deriving an affine motion vector in an affine Motion Vector Field (MVF) for a chroma subblock out of the plurality of chroma subblocks using an average luma motion vector derived from motion vectors of the corresponding luma subblocks, wherein the motion vectors from different corresponding luma subblocks are used for deriving the average luma motion vector according to different variables corresponding to different color sampling formats, wherein the motion vectors of the corresponding luma subblocks are derived by deriving affine motion vectors for the corresponding luma subblocks based on a control point based affine motion model and invoking a rounding process with the affine motion vectors of the corresponding luma subblocks, rightShift set equal to 7, and leftShift set equal to 0 as inputs, and wherein the variables comprise a first variable and a second variable according to the color sampling formats, the first variable is SubWidthC indicating width of chroma subblocks and the second variable is SubHeightC indicating height of chroma subblocks, in response to determining that both of the first variable and the second variable are equal to 1, the average luma motion vector is the motion vector of one corresponding luma subblock without the averaging process, wherein the one corresponding luma subblock is determined as a luma subblock of which the position is the same as that of the chroma subblock, and in response to determining that the first variable is equal to 2 and the second variable is equal to 1, the average luma motion vector is derived by taking an average of the motion vectors of two corresponding luma subblocks, wherein the two corresponding luma subblocks are luma subblocks of which the horizontal positions are different from that of the chroma subblock and the vertical positions are the same as that of the chroma subblock.

6. The non-transitory computer readable storage medium of claim 5, wherein the method for video decoding further comprises: left shifting the motion vectors of control points of the corresponding luma subblocks and deriving the motion vectors of the corresponding luma subblocks by the left shifted motion vectors.

* * * * *